United States Patent
Saathoff et al.

(10) Patent No.: US 10,135,536 B2
(45) Date of Patent: Nov. 20, 2018

(54) TRANSMITTER OPTICAL SIGNAL TO NOISE RATIO IMPROVEMENT THROUGH RECEIVER AMPLIFICATION IN SINGLE LASER COHERENT SYSTEMS

(71) Applicant: Elenion Technologies, LLC, New York, NY (US)

(72) Inventors: Guido Saathoff, Munich (DE); Matthew Akio Streshinsky, New York, NY (US); Robert Palmer, Munich (DE); Torsten Wuth, Munich (DE)

(73) Assignee: Elenion Technologies, LLC, New York, NY (US)

( * ) Notice: Subject to any disclaimer, the term of this patent is extended or adjusted under 35 U.S.C. 154(b) by 0 days.

(21) Appl. No.: 15/405,516

(22) Filed: Jan. 13, 2017

(65) Prior Publication Data
US 2017/0134094 A1     May 11, 2017

Related U.S. Application Data

(63) Continuation of application No. 14/794,889, filed on Jul. 9, 2015, now Pat. No. 9,571,200.

(51) Int. Cl.
*H04B 10/40* (2013.01)
*H04B 10/61* (2013.01)

(52) U.S. Cl.
CPC .......... *H04B 10/40* (2013.01); *H04B 10/615* (2013.01); *H05K 999/99* (2013.01)

(58) Field of Classification Search
CPC .......... H04B 10/2916; H04B 10/2912; H04B 10/1125; H04B 10/40; H04B 10/2937; H04J 14/0221; H04J 14/02

USPC ....................................................... 398/136
See application file for complete search history.

(56) References Cited

U.S. PATENT DOCUMENTS

| | | |
|---|---|---|
| 4,739,396 A | 4/1988 | Hyatt |
| 6,529,305 B1 | 3/2003 | Meeker |
| 7,200,308 B2 | 4/2007 | Hochberg |
| 7,339,724 B2 | 3/2008 | Hochberg |
| 7,424,192 B2 | 9/2008 | Hochberg |
| 7,480,434 B2 | 1/2009 | Hochberg |
| 7,643,714 B2 | 1/2010 | Hochberg |
| 7,760,970 B2 | 7/2010 | Baehr-Jones |
| 7,894,696 B2 | 2/2011 | Baehr-Jones |
| 7,936,999 B1 * | 5/2011 | Hawryluck ............ H04B 10/60 398/152 |
| 8,031,985 B2 | 10/2011 | Hochberg |
| 8,067,724 B2 | 11/2011 | Hochberg |
| 8,098,965 B1 | 1/2012 | Baehr-Jones |
| 8,203,115 B2 | 6/2012 | Hochberg |
| 8,237,102 B1 | 8/2012 | Baehr-Jones |

(Continued)

FOREIGN PATENT DOCUMENTS

| | | |
|---|---|---|
| EP | 1496636 A1 | 1/2005 |
| WO | WO 2014/141685 A1 | 9/2014 |

OTHER PUBLICATIONS

International Search Report, PCT/US2016/041748, dated Oct. 27, 2016 (3 pages).

(Continued)

*Primary Examiner* — Don N Vo
(74) *Attorney, Agent, or Firm* — Nixon Peabody LLP

(57) ABSTRACT

A transceiver having an improved transmitter optical signal to noise ratio, and methods of making and using the same.

15 Claims, 4 Drawing Sheets

(56) References Cited

U.S. PATENT DOCUMENTS

| | | | |
|---|---|---|---|
| 8,258,476 B1 | 9/2012 | Baehr-Jones | |
| 8,270,778 B2 | 9/2012 | Hochberg | |
| 8,280,211 B1 | 10/2012 | Baehr-Jones | |
| 8,311,374 B2 | 11/2012 | Hochberg | |
| 8,340,486 B1 | 12/2012 | Hochberg | |
| 8,380,016 B1 | 2/2013 | Hochberg | |
| 8,390,922 B1 | 3/2013 | Baehr-Jones | |
| 8,798,406 B1 | 8/2014 | Hochberg | |
| 8,818,141 B1 | 8/2014 | Hochberg | |
| 2004/0085624 A1* | 5/2004 | Liu | H01S 3/06758 359/341.3 |
| 2008/0199181 A1* | 8/2008 | Nakano | H04B 10/40 398/79 |
| 2008/0273876 A1* | 11/2008 | Lundquist | H04B 10/296 398/59 |
| 2010/0091355 A1* | 4/2010 | Ota | H04B 10/291 359/337 |
| 2013/0071105 A1 | 3/2013 | Chang | |
| 2013/0343751 A1* | 12/2013 | Mamyshev | H04B 10/61 398/38 |
| 2014/0064734 A1 | 3/2014 | Witzens | |
| 2015/0036210 A1* | 2/2015 | Asobe | G02F 1/39 359/341.3 |
| 2016/0248519 A1* | 8/2016 | Novack | H04B 10/564 |
| 2017/0272160 A1* | 9/2017 | Xu | H04B 10/10 |

OTHER PUBLICATIONS

Written Opinion of the International Searching Authority, PCT/US2016/041748, dated Oct. 27, 2016 (10 pages).

* cited by examiner

TRANSMITTER OPTICAL SIGNAL TO NOISE RATIO IMPROVEMENT THROUGH RECEIVER AMPLIFICATION IN SINGLE LASER COHERENT SYSTEMS

CROSS-REFERENCE TO RELATED APPLICATIONS

This application is a continuation of U.S. patent application Ser. No. 14/794,889, filed Jul. 9, 2015, now allowed, which is hereby incorporated by reference herein in its entirety.

FIELD OF THE INVENTION

The invention relates to optical communication systems in general and particularly to a receiver for an optical communication system.

BACKGROUND OF THE INVENTION

In coherent optical communication systems, optical amplifiers are often used at the output of the transmitter (Tx). Additionally, in power- and cost-constrained systems, a single laser may be shared between the transmitter and local oscillator (LO) in the receiver (Rx). In such a system using a Tx optical amplifier, the output Tx optical signal to noise ratio (OSNR) is typically limited by amplified spontaneous emission (ASE) noise due to the optical amplifier. The OSNR can be improved by reducing the insertion loss of the transmitter or by increasing the laser power dedicated to the transmitter. Typically, both of these parameters are fixed.

FIG. 1 is a schematic block diagram 100 of a prior art coherent optical transceiver 102, in which in-line power monitor photodiodes and fiber optic splices are omitted. A WDM coupler couples the light from pump laser 114 into the Tx EDFA 106. The Tx photodiode (PD) 116 is used to control the Tx EDFA 106 gain via a feedback loop 118 to control the pump laser 114 current. The light from the tunable laser 108 is shared between Tx 110 and Rx 112 and its splitting ratio is dictated by the required LO power $P_{LO}$ as explained below. The incoming receiver signal power $P_r$ and the target photo current $I_r \propto \sqrt{P_{LO} P_r}$ determine the LO power $P_{LO}$ and, therefore, the Tx power $P_{Tx}$. As shown in FIG. 1, an electrical TX input 120, an optical Tx output 122, an optical RX input 130 and an electrical Rx output 132 are present.

The proportion of the system laser power dedicated to the Tx, $P_{Tx}$, is dictated by what is needed for the LO in the receiver. The required LO power, $P_{LO}$, is determined by the amount of gain one needs in the receiver. In coherent intradyne detection, the input received optical signal, $P_r$, is mixed with a higher powered local oscillator $P_{LO}$ near the same frequency in order to boost the power in the mixing products at the intermediate frequencies $\omega_{IF} = \omega_r - \omega_{LO}$, where $\omega_r$ is a frequency within the signal bandwidth. Given a signal input power $P_r$, detector responsivity R, and target current output $I_r \propto R\sqrt{P_{LO}}\sqrt{P_r}$, the LO power is fixed.

There is a need for systems that provide an optical communication system with improved optical signal to noise ratio.

SUMMARY OF THE INVENTION

According to one aspect, the invention features a transceiver having an improved optical signal to noise ratio, comprising: a transmitter having an electrical transmitter input port and an optical transmitter output port; a receiver having an optical receiver input port and an electrical receiver output port; a first coherent optical source shared between the transmitter and the receiver and configured to provide illumination with intensity $P_T$ to the transmitter and illumination with intensity $P_{LO}$ to the receiver; a second coherent optical source in optical communication with the optical transmitter output port by way of an optical coupler, the optical transmitter output port comprising a first optical amplifier, the second coherent optical source having a first optical feedback loop control; and a second optical amplifier configured to receive an input optical signal from the second coherent optical source, and to provide amplified illumination to an optical intensity controller, the optical intensity controller configured to provide controlled intensity illumination to the receiver, the optical intensity controller being part of a second feedback loop.

In one embodiment, the first coherent optical source is a tunable laser.

In another embodiment, the second coherent optical source is a pump laser.

In still another embodiment, at least one of the first optical amplifier and the second optical amplifier is a fiber amplifier.

In yet another embodiment, the fiber amplifier is an EDFA.

In a further embodiment, the first optical feedback loop control comprises a photodetector and an optical feedback loop controller.

In yet a further embodiment, the optical intensity controller is a variable optical attenuator.

In an additional embodiment, the second optical amplifier configured to receive an input optical signal from the second coherent optical source is in optical connection to the second coherent optical source by way of an optical splitter.

In one more embodiment, the improved optical signal to noise ratio is an improved transmitter optical signal to noise ratio.

In still another embodiment, the transceiver having an improved optical signal to noise ratio further comprises a variable power splitter configured to receive optical power from the first coherent optical source and configured to provide illumination with intensity $P_T$ to the transmitter and illumination with intensity $P_{LO}$ to the receiver so that the ratio between the intensity $P_T$ and the intensity $P_{LO}$ can be set to a desired value.

According to another aspect, the invention features an improved transceiver having an improved optical signal to noise ratio, the transceiver having a transmitter having an electrical transmitter input port and an optical transmitter output port, a receiver having an optical receiver input port and an electrical receiver output port, a first coherent optical source shared between the transmitter and the receiver and configured to provide illumination with intensity $P_T$ to the transmitter and illumination with intensity $P_{LO}$ to the receiver, and a second coherent optical source in optical communication with the optical transmitter output port by way of an optical coupler, the optical transmitter output port comprising a first optical amplifier, the second coherent optical source having a first optical feedback loop control; wherein the improvement comprises: a second optical amplifier configured to receive an input optical signal from the second coherent optical source, and to provide amplified illumination to an optical intensity controller, the optical intensity controller configured to provide controlled intensity illumination to the receiver, the optical intensity controller being part of a second feedback loop.

According to yet another aspect, the invention relates to a method of making a transceiver having an improved optical signal to noise ratio. The method comprises the steps of: providing a transmitter having an electrical transmitter input port and an optical transmitter output port; providing a receiver having an optical receiver input port and an electrical receiver output port; providing a first coherent optical source shared between the transmitter and the receiver and configured to provide illumination with intensity $P_T$ to the transmitter and illumination with intensity $P_{LO}$ to the receiver; providing a second coherent optical source in optical communication with the optical transmitter output port by way of an optical coupler, the optical transmitter output port comprising a first optical amplifier, the second coherent optical source having a first optical feedback loop control; and providing a second optical amplifier configured to receive an input optical signal from the second coherent optical source, and to provide amplified illumination to an optical intensity controller, the optical intensity controller configured to provide controlled intensity illumination to the receiver, the optical intensity controller being part of a second feedback loop.

According to still another aspect, the invention relates to a method of using a transceiver having an improved optical signal to noise ratio. The method comprises the steps of: providing a transmitter having an electrical transmitter input port and an optical transmitter output port; providing a receiver having an optical receiver input port and an electrical receiver output port; providing a first coherent optical source shared between the transmitter and the receiver and configured to provide illumination with intensity $P_T$ to the transmitter and illumination with intensity $P_{LO}$ to the receiver; providing a second coherent optical source in optical communication with the optical transmitter output port by way of an optical coupler, the optical transmitter output port comprising a first optical amplifier, the second coherent optical source having a first optical feedback loop control; providing a second optical amplifier configured to receive an input optical signal from the second coherent optical source, and to provide amplified illumination to an optical intensity controller, the optical intensity controller configured to provide controlled intensity illumination to the receiver, the optical intensity controller being part of a second feedback loop; operating the first coherent optical source and the second coherent optical source; applying at least one of an electrical input signal to the electrical transmitter input port and an optical input signal to the optical receiver input port; and performing at least one of: transmitting an optical signal responsive to the electrical input signal; and receiving an electrical signal responsive to the optical input signal.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

Acronyms

A list of acronyms and their usual meanings in the present document (unless otherwise explicitly stated to denote a different thing) are presented below.

ASE Amplified Spontaneous Emission
CMOS Complementary Metal-Oxide-Semiconductor
DBR Distributed Bragg Reflector
DSP Digital Signal Processor
ECL External Cavity Laser
EDFA Erbium Doped Fiber Amplifier
E/O Electro-optical
FDTD Finite Difference Time Domain
FFE Feed-Forward Equalization
FOM Figure of Merit
FSR Free Spectral Range
FWHM Full Width at Half Maximum
LIV Light intensity(L)-Current(I)-Voltage(V)
OSNR Optical Signal to Noise Ratio
PIC Photonic Integrated Circuits
PRBS Pseudo Random Bit Sequence
PDFA Praseodymium-Doped-Fiber-Amplifier
RSOA Reflective Semiconductor Optical Amplifier
Rx Receiver
SMSR Single-Mode Suppression Ratio
Tx Transmitter
VOA Variable Optical Attenuator
WDM Wavelength Division Multiplexing This invention involves sharing the pump laser power used to operate the Tx fiber amplifier with an additional Rx fiber amplifier in order to improve the output Tx power and, as a result, the Tx OSNR of a coherent optical transceiver using a single pump laser source. Since the output signal power and the required gain of the Rx optical amplifier is much lower than those of the Tx optical amplifier, only a small fraction of the pump laser power is required for the Rx optical amplifier.

Example Implementation

Figure 1:
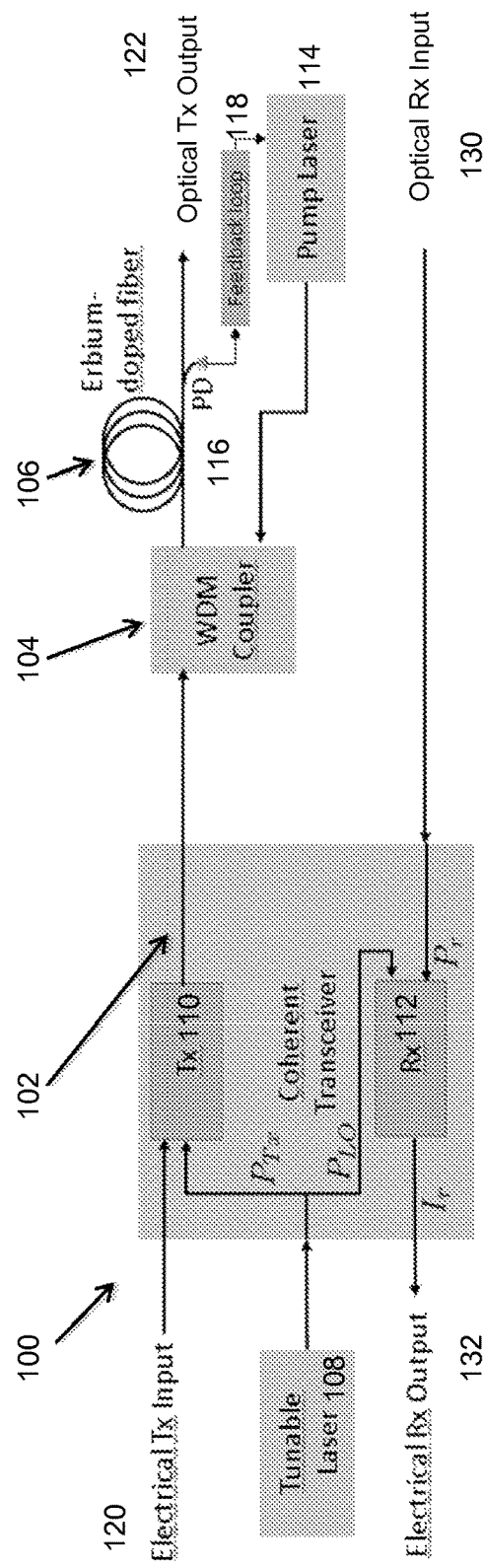
FIG. 1 is a schematic block diagram of a prior art coherent optical transceiver.
Figure 2:
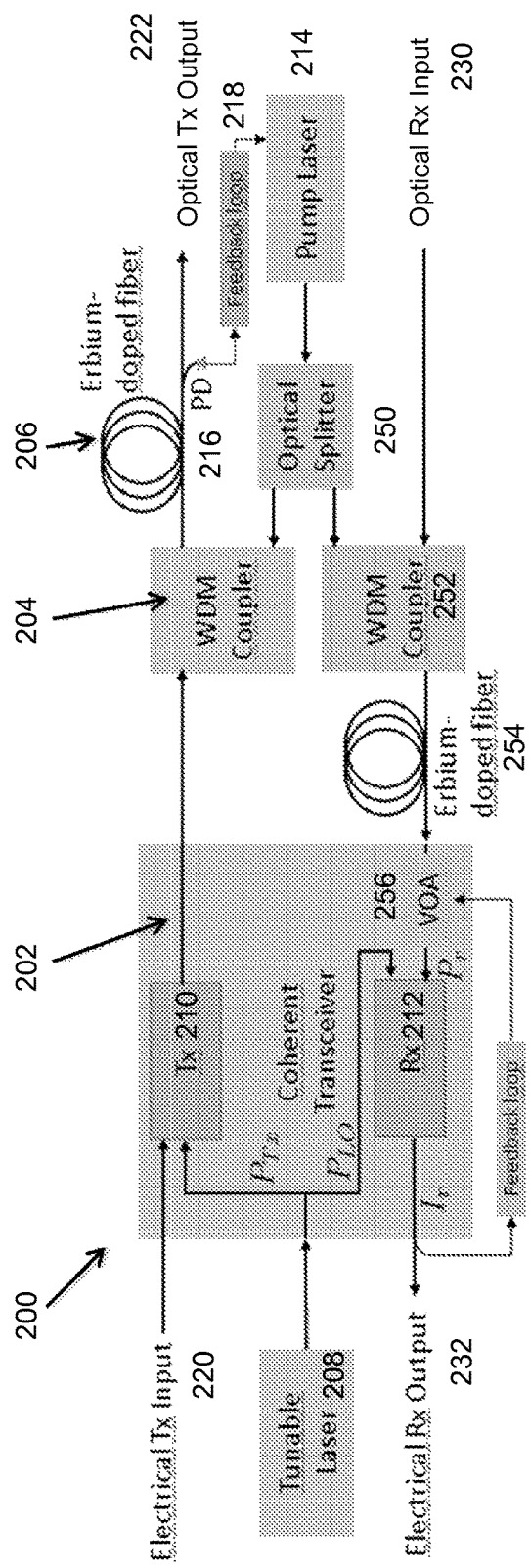
FIG. 2 is a schematic diagram of one embodiment of an apparatus having a single pump laser source for two Erbium-doped fiber coils according to principles of the invention.

FIG. 2 is a schematic diagram of one embodiment of an apparatus having a single pump laser source for two amplification fiber coils (in the embodiment illustrated, the amplification fiber coils are Erbium-doped fiber amplifier coils) according to principles of the invention. The method of using a single pump laser source for two amplification fiber coils is also described. The required gain and output power in the Rx optical amplifier is much lower than in the Tx optical amplifier. Therefore, the optical splitter need only tap off a small fraction of the pump laser power for the Rx optical amplifier. In other embodiments, amplifiers other than EDFA amplifiers may be used.

As illustrated in FIG. 2 is a schematic block diagram 200 of a prior art coherent optical transceiver 202, in which in-line power monitor photodiodes and fiber optic splices are omitted. The pump laser 214 provides illumination to an optical splitter 250 which can split the illumination in desired proportions. One portion of the illumination from the pump laser 214 is provided to the WDM coupler 204 that couples into the optical Tx output. The Tx photodiode (PD) 216 is used to control the Tx EDFA 206 gain via a feedback loop 218 that samples the output of Tx EDFA 206 and controls the current driving the pump laser 214. Another portion of the illumination from the pump laser 214 is provided by signal splitter 250 to the WDM coupler 252 that feeds an Erbium-doped fiber 256 which provides amplification of illumination entering on the Optical Rx input 230. The amplified light exits the Erbium-doped fiber 256 and is fed into a VOA 256 that in turn feeds into the Rx 212. The VOA 256 is controlled by a feedback loop 258 that samples the output of Rx 212, and provides a control signal to the VOA 256.

The light from the tunable laser 208 is shared between Tx 210 and Rx 212 and its splitting ratio is dictated by the required LO power $P_{LO}$. As shown in FIG. 2, an electrical TX input 220, an optical Tx output 222, an optical RX input 230 and an electrical Rx output 232 are present.

An increase of the signal power, $P_r$, at the receiver through an additional optical pre-amplifier with gain $G_r$ in front of the receiver allows one to lower the required LO power $P_{LO}$ by the same factor $G_r$. In amplifier-noise limited transmission, for example in metro and long haul links using optical amplifier chains, the decrease in signal-to-noise ratio (SNR) at the receiver associated with the additional optical pre-amplifier noise is marginal as can be seen by the Friis formula:

$$F_{total} = F_1 + \frac{F_2 - 1}{G_1} + \frac{F_3 - 1}{G_1 G_2} + \frac{F_4 - 1}{G_1 G_2 G_3} + \ldots + \frac{F_n - 1}{G_1 G_2 \ldots G_{n-1}}$$

Here, $F_{total}$ is the noise figure of the complete amplifier chain with amplifiers exhibiting individual gains $G_i$ and noise figures $F_i$. The contribution of the last amplifier, in our case the additional optical pre-amplifier for the receiver, is strongly suppressed.

However despite of the benefit of an optical pre-amplifier, it is often not desirable to duplicate the pump laser due to cost and space concerns. Additionally, the electrical power required by an additional pump laser would be disadvantageous in small form factor devices, such as the CFP2 form factor.

While the Tx EDFA gain is controlled via the EDFA pump power, the gain control of the Rx EDFA fed by the same pump would require an additional variable optical attenuator (VOA) for the Rx EDFA pump light.

In the present invention, one uses a free running (not gain-controlled) Rx EDFA and one controls the Rx EDFA output power with a VOA. The Rx input VOA can more easily be implemented in the receiver input signal path.

For purposes of elucidation of features of the invention, one can stipulate that the coherent transceiver block outputs an average modulated Tx output power of −17 dBm. In conventional optical communication systems the typical system output power requirements are at least +1 dBm. Therefore, the Tx optical amplifier needs to supply 18 dB of gain. This may be accomplished with 18 meters of erbium-doped fiber and 30 mW of pump power.

In the Rx, only 5 or 10 dB of gain is desired, which can be accomplished with 5 meters of erbium-doped fiber and less than 10 mW of pump optical power. Therefore, a 40 mW pump laser can be used and a 1:4 splitter can supply both EDFA coils.

The 16 dBm laser input was previously being split 50:50 between Tx and Rx LO. With an Rx amplifier, 9 dBm could be used for the LO instead of 13 dBm. This would allow the Tx to use 15 dBm, for a gain in output OSNR of 2 dB.

Those of ordinary skill in the art will understand that the numerical values provided in the embodiment describe represent one example, and are provided for the purpose of explanation. Actual numerical values and power requirements may vary in different embodiments.

Figure 3:
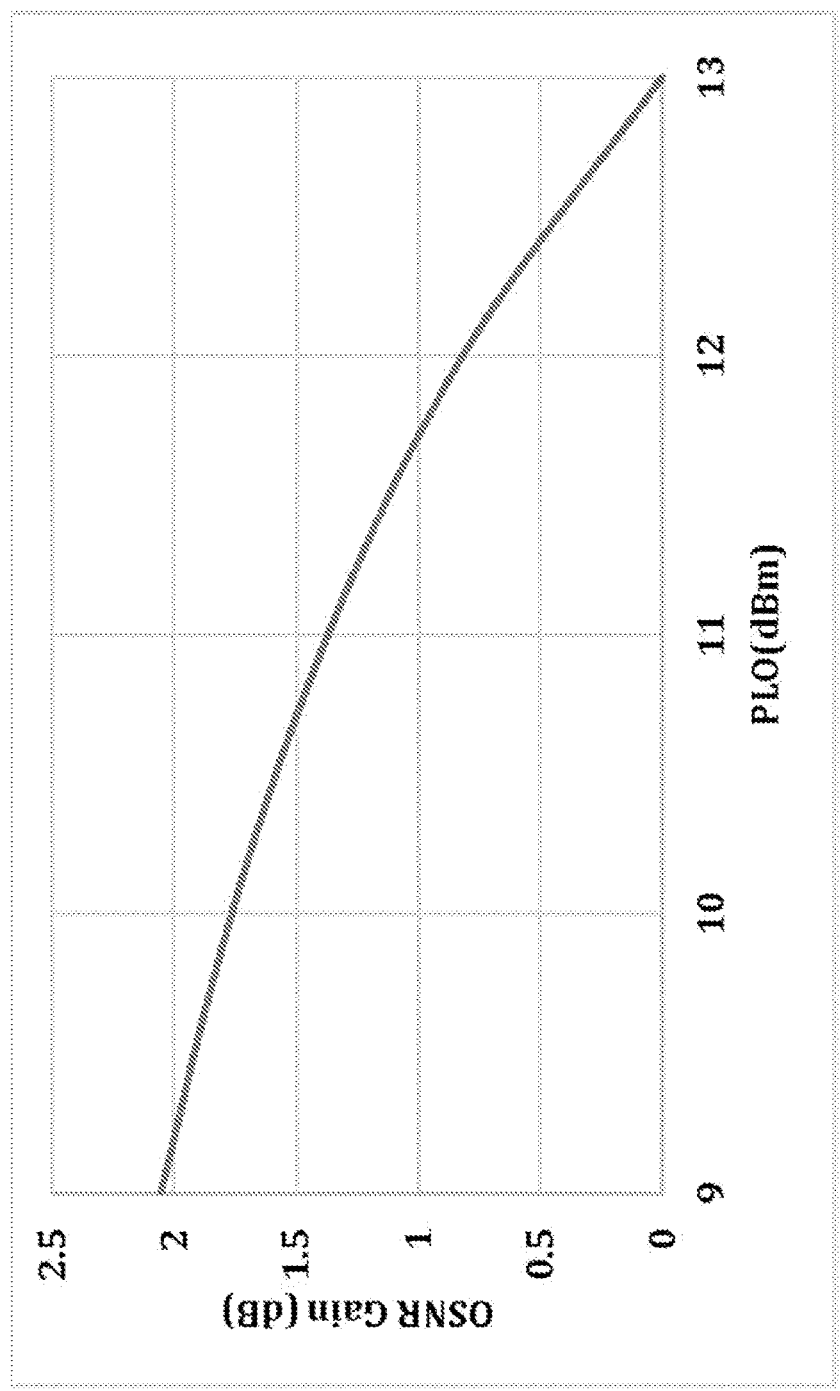
FIG. 3 is a graph showing the OSNR gain vs LO power relative to a 50:50 split of a 16 dBm output power tunable laser.

FIG. 3 is a graph showing the OSNR gain vs LO power relative to a 50:50 split of a 16 dBm output power tunable laser. Reducing $P_{LO}$ from 13 dBm to 9 dBm allows one to increase $P_{Tx}$ from 13 dBm to 15 dBm, thus boosting Tx OSNR by 2 dB.

As has been explained, the Rx fiber amplifier can be used to increase the Tx power/OSNR as much as possible. This is optimal for OSNR limited systems.

Figure 4:
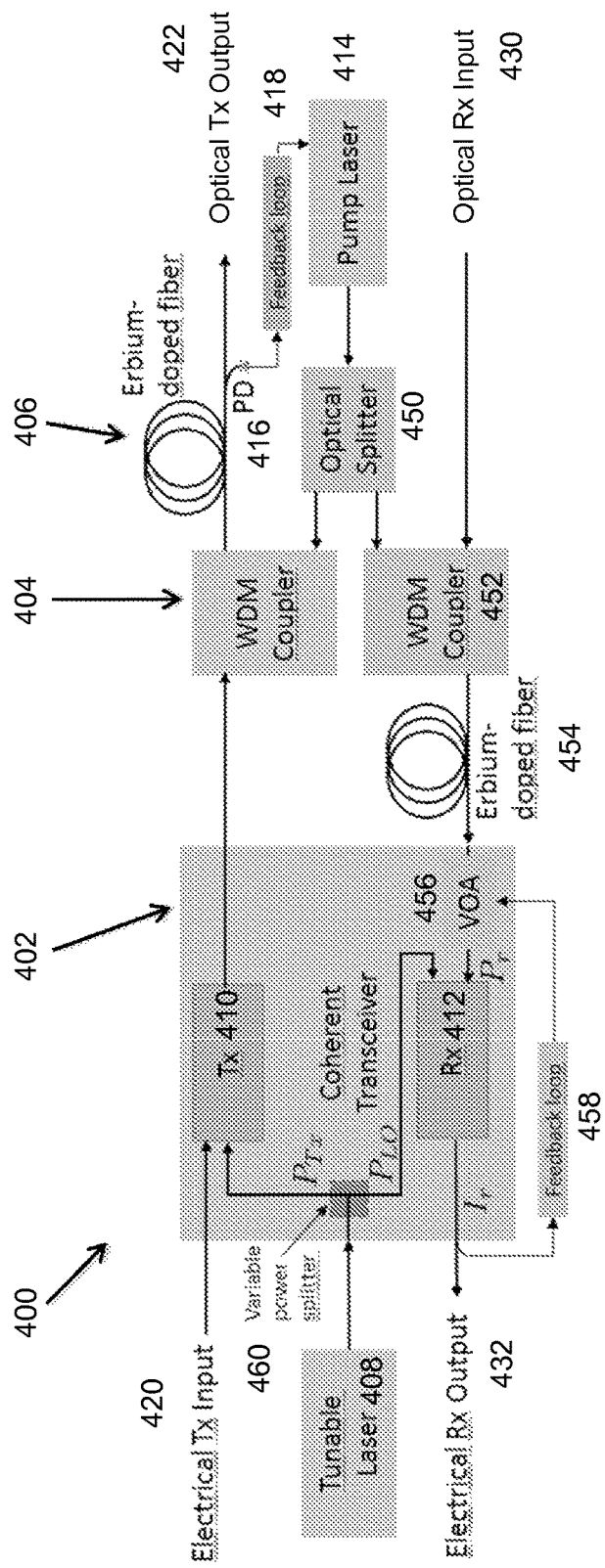
FIG. 4 is a schematic diagram of one embodiment of an apparatus having a single pump laser source for two Erbium-doped fiber coils and a tunable laser with a variable power splitter according to principles of the invention.

FIG. 4 is a schematic diagram of one embodiment of an apparatus having a single pump laser source for two Erbium-doped fiber coils and a tunable laser with a variable power splitter according to principles of the invention. In the embodiment illustrated, the amplification fiber coils are Erbium-doped fiber amplifier coils. In other embodiments, amplifiers other than EDFA amplifiers may be used.

As illustrated in FIG. 4 is a schematic block diagram 400 of a prior art coherent optical transceiver 402, in which in-line power monitor photodiodes and fiber optic splices are omitted. The pump laser 414 provides illumination to an optical splitter 450 which can split the illumination in desired proportions. One portion of the illumination from the pump laser 414 is provided to the WDM coupler 404 that couples into the optical Tx output. The Tx photodiode (PD) 416 is used to control the Tx EDFA 406 gain via a feedback loop 418 that samples the output of Tx EDFA 406 and controls the current driving the pump laser 414. Another portion of the illumination from the pump laser 414 is provided by signal splitter 450 to the WDM coupler 452 that feeds an Erbium-doped fiber 456 which provides amplification of illumination entering on the Optical Rx input 430. The amplified light exits the Erbium-doped fiber 456 and is fed into a VOA 456 that in turn feeds into the Rx 412. The VOA 456 is controlled by a feedback loop 458 that samples the output of Rx 412, and provides a control signal to the VOA 456.

The light from the tunable laser 408 is shared between Tx 410 and Rx 412 and its splitting ratio is controlled by a variable power splitter 460 so that the ratio between the Tx power $P_{Tx}$ (or the intensity $P_T$) and the LO power $P_{LO}$ (or the intensity $P_{LO}$) can be varied and can be set to a desired value. As shown in FIG. 4, an electrical TX input 420, an optical Tx output 422, an optical RX input 430 and an electrical Rx output 432 are present.

In combination with the single laser transceiver and a Rx fiber amplifier, a tunable laser with a variable power splitter in the transceiver allows for variable split ratios between the Tx power and the LO power. This variability enables a flexible trade-off between Tx OSNR and Rx sensitivity and dynamic range. In combination with a variable power splitter on the transceiver, as shown in FIG. 4, the shared pump Rx fiber amplifier provides a flexible transceiver capable of trading off Rx dynamic range vs Tx OSNR and, thus, extending the range of applications.

It is believed that for future metro and short reach networks which may be Rx input power limited, the shared pump Rx fiber amplifier could also be used to increase receiver dynamic range at the expense of Tx OSNR. By dedicating more laser power to the LO of the Rx together with the amplification of the Rx input signal, the Rx sensitivity/dynamic range could be significantly increased. For a 50/50 split (13 dBm LO power for a 16 dBm input power laser), the full gain (5 to 10 dB) of the Rx fiber amplifier would be usable to increase the Rx sensitivity.

Design and Fabrication

Methods of designing and fabricating devices having elements similar to those described herein are described in one or more of U.S. Pat. Nos. 7,200,308, 7,339,724, 7,424,192, 7,480,434, 7,643,714, 7,760,970, 7,894,696, 8,031,985, 8,067,724, 8,098,965, 8,203,115, 8,237,102, 8,258,476, 8,270,778, 8,280,211, 8,311,374, 8,340,486, 8,380,016, 8,390,922, 8,798,406, and 8,818,141, each of which documents is hereby incorporated by reference herein in its entirety.

Definitions

As used herein, the term "optical communication channel" is intended to denote a single optical channel, such as light that can carry information using a specific carrier wavelength in a wavelength division multiplexed (WDM) system. In some embodiments, the Rx input signal can in principle carry a large number of optical communication channels. The LO is used to select which of them shall be detected at any given time.

As used herein, the term "optical carrier" is intended to denote a medium or a structure through which any number of optical signals including WDM signals can propagate, which by way of example can include gases such as air, a void such as a vacuum or extraterrestrial space, and structures such as optical fibers and optical waveguides.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. An optical transceiver, comprising:
   an optical transmitter configured to receive input light and an electrical input signal and to transmit an output optical signal;
   a coherent optical receiver configured to receive an input optical signal and local oscillator (LO) light and to output an electrical output signal;
   a first shared optical source optically connected to said optical transmitter and said coherent optical receiver so as to provide the input light to said optical transmitter and the LO light to said coherent optical receiver;
   a first gain-controlled optical amplifier disposed to amplify the output optical signal and to transmit amplified output optical signal;
   a second free-running optical amplifier disposed to amplify an optical signal received by the optical transceiver and to provide an amplified received optical signal to the coherent optical receiver as the input optical signal;
   a second shared optical source configured to emit pump energy, the second shared optical source optically connected to the first optical amplifier and the second optical amplifier so as to provide a first portion of the pump energy to the first optical amplifier and a second portion of the pump energy to the second optical amplifier;
   a first control loop for controlling gain of the first gain-controlled optical amplifier to control amplification of the output optical signal; and
   a second control loop, including a variable optical attenuator, configured to control an optical power of the input optical signal received by the coherent optical receiver based on the amplification of the second free-running optical amplifier, an optical power of the LO light and the electrical output signal of the coherent optical receiver.

2. The optical transceiver of claim 1, comprising an optical splitter disposed to receive the pump energy from the second shared optical source and configured to split the pump energy into the first and second pump energy portions so that the first pump energy portion is greater than the second pump energy portion, the optical splitter connected to couple the first pump energy portion into the first optical amplifier and to couple the second pump energy portion into the second optical amplifier.

3. The optical transceiver of claim 2 including a first optical coupler disposed to couple the first pump energy portion into the first optical amplifier and a second optical coupler disposed to couple the second pump energy portion into the second optical amplifier.

4. The optical transceiver of claim 1, wherein the first a control loop is configured to vary current to the second shared optical source in dependence upon the amplified output optical signal.

5. The transceiver of claim 4, wherein the first control loop comprises a photodetector and a feedback loop controller.

6. The optical transceiver of claim 1, including a second optical splitter disposed to receive coherent light from the first shared optical source, and configured to split said coherent light into the input light with intensity PT and the LO light with intensity PLO.

7. The optical transceiver of claim 6, wherein the second optical splitter comprises a variable optical power splitter.

8. The transceiver of claim 1, wherein the first shared optical source comprises a wavelength-tunable laser, and the second shared optical source comprises a pump laser.

9. The transceiver of claim 1, wherein at least one of the first optical amplifier and the second optical amplifier comprises a fiber amplifier.

10. A method for an optical transceiver with an improved output optical signal to noise ratio, the optical transceiver comprising an optical transmitter, a coherent optical receiver, and a source of coherent optical radiation that is configured to provide input light to the optical transmitter and local oscillator (LO) light to the coherent optical receiver, the method comprising:
- amplifying an output optical signal of the optical transmitter with a first gain-controlled optical amplifier;
- amplifying an optical signal received by the coherent optical receiver as an input optical signal thereof with a second free-running optical amplifier;
- providing a first portion of pump energy from a shared pump source to the first optical amplifier and a second portion of the pump energy to the second optical amplifier;
- controlling amplification of the first gain-controlled optical amplifier with a first gain control loop; and
- attenuating an optical power of the input optical signal received by the coherent optical receiver based on amplification of the second optical amplifier, an optical power of the LO light and the electrical output signal of the coherent optical receiver using a second control loop, including a variable optical attenuator.

11. A method of operating an optical transceiver comprising an optical transmitter, a coherent optical receiver, and a first shared optical source of coherent radiation that is configured to provide input light to the optical transmitter and local oscillator (LO) light to the coherent optical receiver, the method comprising:
- generating pump energy with a second shared optical source;
- providing a first portion of the pump energy generated by the second shared optical source to a first gain-controlled optical amplifier disposed in an output optical signal path of the optical transmitter;
- controlling amplification of the first gain-controlled optical amplifier with a first gain control loop;
- providing a second portion of the pump energy generated by the second shared optical source to a second free-running optical amplifier that is disposed in an input optical signal path of the optical transceiver to amplify an input optical signal into the coherent optical receiver, thereby enabling an improved output optical signal to noise ratio for the optical transmitter by providing a greater portion of coherent radiation of the first shared optical source to the optical transmitter; and
- attenuating an optical power of the input optical signal received by the coherent optical receiver in dependence on amplification of the second optical amplifier, an optical power of the LO light and the electrical output signal of the coherent optical receiver using a second control loop, including a variable optical attenuator.

12. The method of claim 11, comprising splitting the pump energy generated by the second shared optical source into two non-equal portions, and providing a greater of the two non-equal portions of the pump energy to the first optical amplifier and a smaller of the two non-equal portions of the pump energy to the second optical amplifier.

13. The method of claim 11, comprising splitting light from the first shared optical source into first and second light portions, and providing the first light portion to the optical transmitter as the input light thereof and the second light portion to the coherent optical receiver as the LO light.

14. The method of claim 13, wherein the splitting of the light from the first shared optical source is performed so as to direct a greater portion thereof into the optical transmitter for enhancing an output optical signal to noise ratio thereof.

15. The method of claim 11, wherein controlling amplification of the first gain-controlled optical amplifier comprises varying the pump energy generated by the second shared optical source in dependence upon an optical signal power at an output of the first gain-controlled optical amplifier.

* * * * *